United States Patent
Wang et al.

(10) Patent No.: US 8,111,734 B2
(45) Date of Patent: Feb. 7, 2012

(54) DEVICE AND METHOD FOR FAST TRANSITION FROM PREAMBLE SYNCHRONIZATION TO DATA DEMODULATION IN DIRECT SEQUENCE SPREAD SPECTRUM (DSSS) COMMUNICATIONS

(75) Inventors: Xinyu Wang, Newbury Park, CA (US);
Marcus Gahler, Redmond, WA (US);
Robert P. Higgins, Seattle, WA (US);
Paul R. Norris, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 1060 days.

(21) Appl. No.: 12/013,542

(22) Filed: Jan. 14, 2008

(65) Prior Publication Data

US 2009/0180524 A1 Jul. 16, 2009

(51) Int. Cl.
*H04B 1/00* (2006.01)
(52) U.S. Cl. .................................. 375/147; 375/140
(58) Field of Classification Search .................. 375/147
See application file for complete search history.

(56) References Cited

U.S. PATENT DOCUMENTS

| | | | |
|---|---|---|---|
| 5,874,913 A * | 2/1999 | Blanchard et al. | 342/352 |
| 2002/0154720 A1 * | 10/2002 | Krasner | 375/364 |
| 2005/0207519 A1 * | 9/2005 | Phang et al. | 375/354 |
| 2006/0268961 A1 * | 11/2006 | Prestwich et al. | 375/146 |
| 2010/0278220 A1 * | 11/2010 | Weill | 375/150 |

* cited by examiner

*Primary Examiner* — David C. Payne
*Assistant Examiner* — Erin File
(74) *Attorney, Agent, or Firm* — Moore & Van Allen PLLC; Charles L. Moore

(57) ABSTRACT

A device for fast transition from preamble synchronization of a received baseband signal to demodulation of the received baseband signal may include a baseband chip tracking loop to generate an offset tracking value to track any initial chip phase offset and Doppler-caused baseband chip frequency drift associated with the received baseband signal. The device may also include a numerical controlled oscillator to correct any Doppler-caused phase rotation associated with the received signal. The device may additionally include a preamble synchronization unit to detect a preamble of the received baseband signal, and to measure a chip phase offset and a baseband Doppler frequency shift associated with the received baseband signal. The chip phase offset may be used to set an initial chip phase offset value of the chip tracking loop so that the chip tracking loop starts with approximately a zero pull-in error. The baseband Doppler frequency shift may be used to set initial frequency offset values in the chip tracking loop and the numerical controlled oscillator so that both start with substantially near-zero offset errors for substantially immediate demodulation of the received signal. The device may further include an output device to output the data demodulated from the received baseband signal.

24 Claims, 8 Drawing Sheets

DEVICE AND METHOD FOR FAST TRANSITION FROM PREAMBLE SYNCHRONIZATION TO DATA DEMODULATION IN DIRECT SEQUENCE SPREAD SPECTRUM (DSSS) COMMUNICATIONS

BACKGROUND OF THE DISCLOSURE

The present disclosure relates to Direct Sequence Spread Spectrum (DSSS) wireless communications and communication devices and more particularly to a device and method for fast transition or substantially immediate transition from preamble synchronization to data demodulation in severe Doppler impairment wireless channels.

In DSSS wireless communications, a data packet being communicated between two devices comprises of a preamble portion and a payload data portion. The preamble portion serves to assist a receiver device to detect a (digitized) arrival data packet in baseband and to synchronize the arrival baseband data packet with the receiver's local Pseudorandom Noise (PN) sequence generators. In DSSS communications, payload data demodulation at the receiver may reconstruct original data only when the PN sequence generated from the receiver's local PN sequence generator precisely aligns with the identical copy of PN sequence embedded in the arrival baseband data packet. PN sequences are in the unit of chips. In DSSS communications, precise chip alignment is accomplished in two steps. In the first step, the preamble synchronization coarsely aligns local PN sequence with the PN sequence embedded in the arrival baseband data packet (may also be referred to as arrival PN sequence herein). The coarse alignment synchronizes the local and arrival PN sequences within a $[-\frac{1}{2}, +\frac{1}{2}]$ chip interval. In the second step, a baseband Chip Tracking Loop (CTL) at receiver employs a feedback structure to fine tune the chip alignment between local and arrival PN sequences. The goal of fine tuning is to align the local and arrival PN sequences within a sub-chip interval. As an example, the sub-chip interval may be one-sixteenth of a chip. The fine tuning consists of an initial pull-in process to remove initial chip phase offsets between local and arrival PN sequences, and a subsequent baseband tracking process to track the baseband Doppler frequency drift between local and arrival PN sequences that may be caused by the relative moving velocity and the relative clock drift rate between transmitter and receiver devices.

Generally, the initial pulling process in the second-step synchronization incurs latency and causes communication bandwidth waste. This is because data demodulation with desirable bit error rate (BER) may only be achieved after chip phase offset between local and arrival PN sequences has been aligned within a substantially small fraction of a chip interval. The initial pulling latency is particularly significant in severe Doppler impairment of wireless channels, wherein the baseband CTL at the receiver has to pull and track a large amount of initial chip phase and baseband frequency offsets between local and arrival PN sequences. Severe Doppler impairment of wireless channels may be characterized by a clock drift between transmitter and receiver devices larger than several (for example about 5 or higher) Parts Per Million (ppm). One well-known solution to reduce the initial pulling latency is to over-sample the arrival baseband signal. Instead of using the Nyquist sampling rate at 2 samples per chip interval, a higher sampling rate, e.g., 4 or 8 samples per chip interval may be used. The high sample rate allows the preamble synchronization process to achieve coarse alignment at a sub-chip accuracy, for example, $[-\frac{1}{4}, +\frac{1}{4}]$ or $[-\frac{1}{8}, +\frac{1}{8}]$ chip interval, and allows baseband CTL to quickly remove an initial chip offset at a small faction of chip interval. This solution is effective in reducing the latency in initial pulling of the receiver's baseband CTL process. However, its reliance on a high sampling rate significantly increases the hardware implementation cost of the preamble synchronization structure.

Additionally, in DSSS communications systems and similar systems, the use of Offset Quadrature Phase Shift Keying (OQPSK) intended to remove the signal signature, may cause cross-talk between in-phase and quadrature components. The cross-talk in-phase and quadrature components may degrade demodulation performance, and it may be difficult to eliminate the cross-talk at low data spreading ratios.

BRIEF SUMMARY OF THE INVENTION

The present invention comprises baseband signal processing that may be applied to a baseband signal. For simplicity, the term "baseband" is omitted in the following descriptions.

In accordance with an embodiment of the present invention, a device for fast transition from preamble synchronization of a received signal to demodulation of the received signal may include a chip tracking loop to generate an offset tracking value to track any initial chip phase offset and Doppler-caused chip frequency drift associated with the received signal. The received signal may be a direct sequence spread spectrum (DSSS) communications signal or similar signal with a high or substantial Doppler frequency shift. The device may also include a numerical controlled oscillator to correct any Doppler-caused phase rotation associated with the received signal. The device may additionally include a preamble synchronization unit to detect preamble of the received signal, and to measure a chip phase offset and a Doppler frequency shift associated with the received signal. The measured chip phase offset may be used to set an initial chip phase offset value of the chip tracking loop so that the chip tracking loop starts with approximately a zero pull-in error. The measured Doppler frequency shift may be used to set initial frequency offset values in the chip tracking loop and the numerical controlled oscillator so that both start with substantially near-zero offset errors for substantially immediate demodulation of the received signal. The device may further include an output device to output the data demodulated from the received signal.

In accordance with another embodiment of the present invention, a communications device may include a receiver to receive a communications signal. The communications signal may be a DSSS communications signal or similar signal with a high or significant Doppler frequency shift. The communications device may also include a preamble synchronization unit to detect preamble of the received communications signal, and a data demodulation unit to demodulate the received communications signal. The communications device may additionally include a burst modem architecture for substantially immediate transition from the preamble synchronization stage to the data demodulation stage in Direct Sequence Spread Spectrum (DSSS) communication or similar communications techniques with a significant Doppler frequency shift. The device may further include an output device to output the demodulated data.

In accordance with a further embodiment of the present invention, a method for fast transition from preamble synchronization of a received signal to demodulation of the received signal may include detecting a preamble of the received signal. The method may also include measuring a chip phase offset and a Doppler frequency shift associated with the received signal. The method may also include setting an initial chip phase offset value of a chip tracking loop in response to the measured chip phase offset so that the chip tracking loop starts with approximately a zero pull-in error. The method may additionally include setting initial frequency offset values in the chip tracking loop and a numerical controlled oscillator in response to the measured Doppler frequency shift so that the chip tracking loop and the numerical controlled oscillator start with substantially near-zero offset errors for substantially immediate demodulation of the received signal. The method may further include demodulating the received signal to extract payload data, and outputting the payload data.

The features, functions, and advantages that have been discussed can be achieved independently in various embodiments of the present invention or may be combined in yet other embodiments further details of which can be seen with reference to the following description and drawings.

Figure 1:
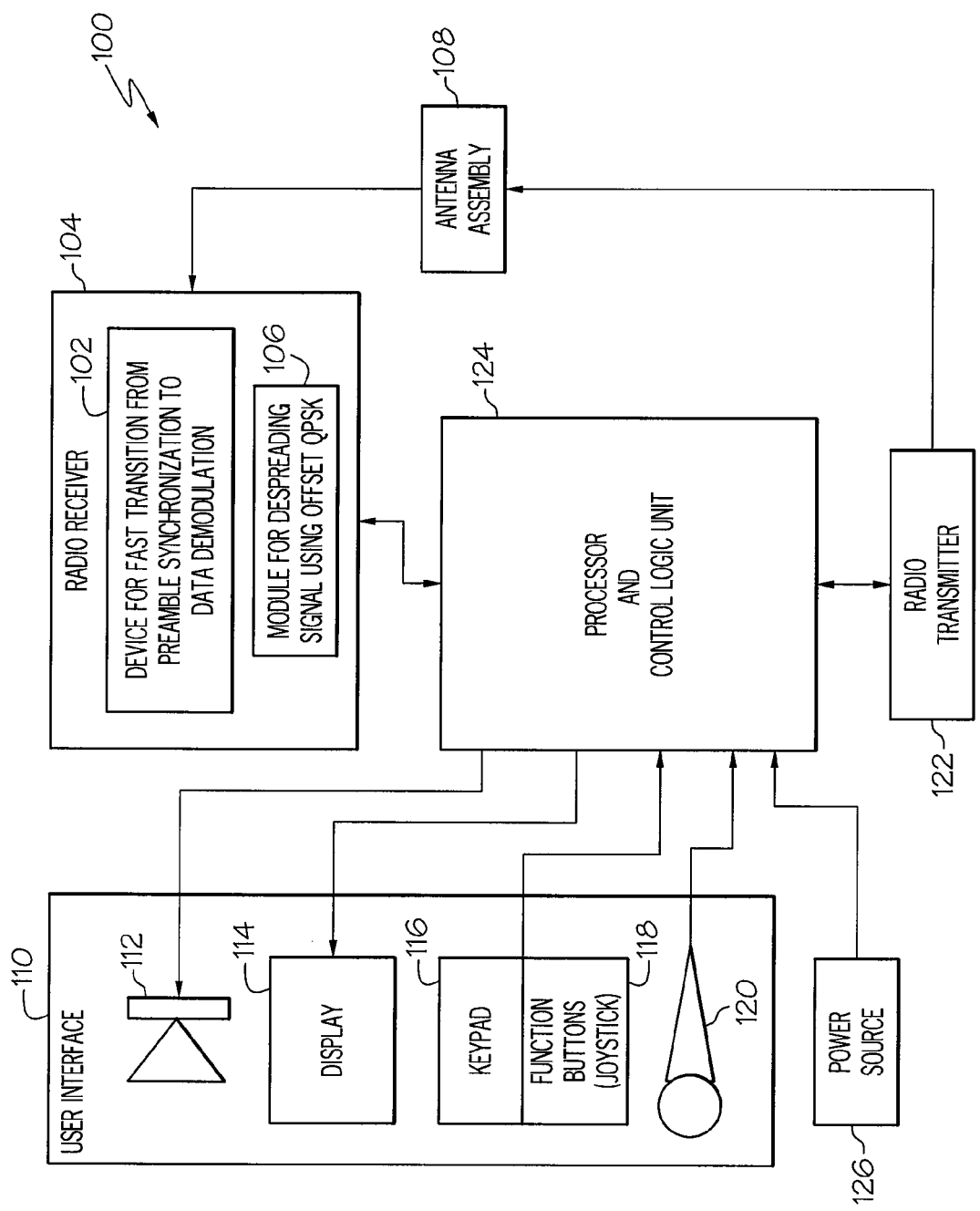
FIG. 1 is a block schematic diagram of an example of a communications device including a device for fast transition from preamble synchronization to data demodulation of a signal in accordance with an embodiment of the present invention.

Other aspects and features of the present invention, as defined solely by the claims, will become apparent to those ordinarily skilled in the art upon review of the following non-limited detailed description of the invention in conjunction with the accompanying figures.

DETAILED DESCRIPTION

The following detailed description of embodiments refers to the accompanying drawings, which illustrate specific embodiments of the disclosure. Other embodiments having different structures and operations do not depart from the scope of the present disclosure.

As will be appreciated by one of skill in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a tangible medium such as a portable computer diskette, a hard disk, a random access memory (RAM), a read-only memory (ROM), an erasable programmable read-only memory (EPROM or Flash memory), an optical fiber, a portable compact disc read-only memory (CD-ROM), or other tangible optical or magnetic storage device; or transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an example of a communications device 100 including a device 102 for fast transition or substantially immediate transition from preamble synchronization to data demodulation of a signal in accordance with an embodiment of the present disclosure. An example of a device 102 for fast transition from preamble synchronization to data demodulation of the signal will be described with reference to FIG. 2. The device 102 may define a burst architecture for fast transition or substantially immediate transition from preamble synchronization to data demodulation in DSSS communication or similar modulation techniques with severe or high Doppler frequency shift.

In wireless communications, DSSS is a spread modulation technique. As with other spread-spectrum technologies, the transmitted signal takes up more bandwidth than the information signal that is being modulated. The name 'spread spectrum' comes from the fact that the carrier signals occur over the full bandwidth (spectrum) of a communications device's transmitting frequency. Features of DSSS include spread modulating information bits with a Pseudorandom Noise (PN) sequence. The PN sequence symbols may be referred to as "chips." Each chip has a much shorter duration than an information bit. That is, each information bit is modulated by a sequence of much faster chips. Therefore, the chip rate is much higher than the information signal bit rate.

DSSS uses a signal structure in which the sequence of chips produced by the transmitter is known a priori by the receiver. The receiver can then use the same PN sequence to counteract the effect of the PN sequence on the received signal in order to reconstruct the information signal or data payload.

The DSSS modulation method involves multiplying the data being transmitted by a "noise" signal. This noise signal is a pseudo-random sequence of 1 and −1 values, at a frequency much higher than that of the original signal, thereby spreading the energy of the original signal into a much wider band. The resulting signals resemble white noise similar to static on an audio recording. However, this noise-like signal can be used to exactly reconstruct the original data at the receiving end by multiplying the received signal by the same pseudo-random sequence. This process is known as despreading. Despreading mathematically constitutes correlation of the transmitted PN sequence with the receiver's assumed sequence. For despreading to work correctly, the transmit and receive sequences must be identical and synchronized.

The device 102 in FIG. 1 for fast transition from preamble synchronization to data demodulation may be associated with a radio receiver 104 of the communications device 100. The device 102 may be integrated into the receiver 104 or may be a separate component.

A module 106 for despreading a received signal or data may also be associated with the receiver 104. The despreading module 106 may be integrated into the receiver 104 or may be a separate component. The module 106 may be used to despread Offset Quadrature Phase Shift Keying (OQPSK) DSSS signal received by the communications device 100. The module 106 may include means to generate an output in-phase signal using signal processing defined by $(X_{Id} \times P_I + X_Q \times P_Q) + (X_I \times P_I + X_{Qd} \times P_Q)$. The module may also include means to generate a quadrature signal using signal processing defined by $(-X_{Id} \times P_Q + X_Q * PI) - (X_I \times P_Q - X_{Qd} \times P_I)$, wherein $X_I$ is an in-phase component of the input signal; $X_Q$ is the quadrature component of the input signal; $X_{Id}$ is an in-phase component of the input signal with one sample delay; $X_{Qd}$ is the quadrature component of the input signal with one sample delay; $P_I$ and $P_Q$ are the in-phase and quadrature components of PN sequence used for OQPSK spreading. These new OQPSK despreading techniques may support a wider range of spreading ratios of OQPSK for use in DSSS communications. This despreading technique may also provide more OQPSK spreading ratio configurations in software defined radio applications. The new OQPSK despreading technique introduces a wider rate adaptation to OQPSK spreading signals through the spreading ratio configuration and therefore provides more radio agility. Additionally, in applications such as cellular radio, wireless local area networks (LAN) and similar applications, the OQPSK despreading technique described above improves bit error rate performance of the OQPSK signal and this allows a given base station to support more simultaneous sessions of users communications.

The communications device 100 may also include an antenna assembly 108 to receive electromagnetic or radio signals which are processed by the receiver 104, or transmit electromagnetic or radio signals which are prepared by radio transmitter 122. A user interface 110 may output the processed or demodulated signals to a user. The user interface 110 may include a speaker 112 to output audio signals and display 114 to present any video signals. The display 114 may also present other information, such as status information, operational information or other data about the communications device 100 to permit control and operation of the device 100.

The user interface 110 may also include a keypad 116, keyboard, function buttons 118 or similar means to permit a user to control operation of the communications device 100 and input data for communication to other devices.

The user interface 110 may also include a microphone 120 to permit verbal or audio communications using the device 100. The acoustic verbal communication energy may be converted to electrical signals by the microphone 120. A radio transmitter 122 may receive the electrical signals from the microphone 120 and may process or modulate the electrical signals to convert them to microwave radio signals for transmission via the antenna assembly 108. The electrical signals may be modulated using a spread-spectrum process, such as DSSS, similar to that previously described.

A processor and control logic unit 124 may be coupled to the different components of the communications device 100 to control overall operation of the different components. The communication device 100 may be powered by a power source 126. The power source 126 may be battery or other electrical energy storage apparatus.

Figure 2:
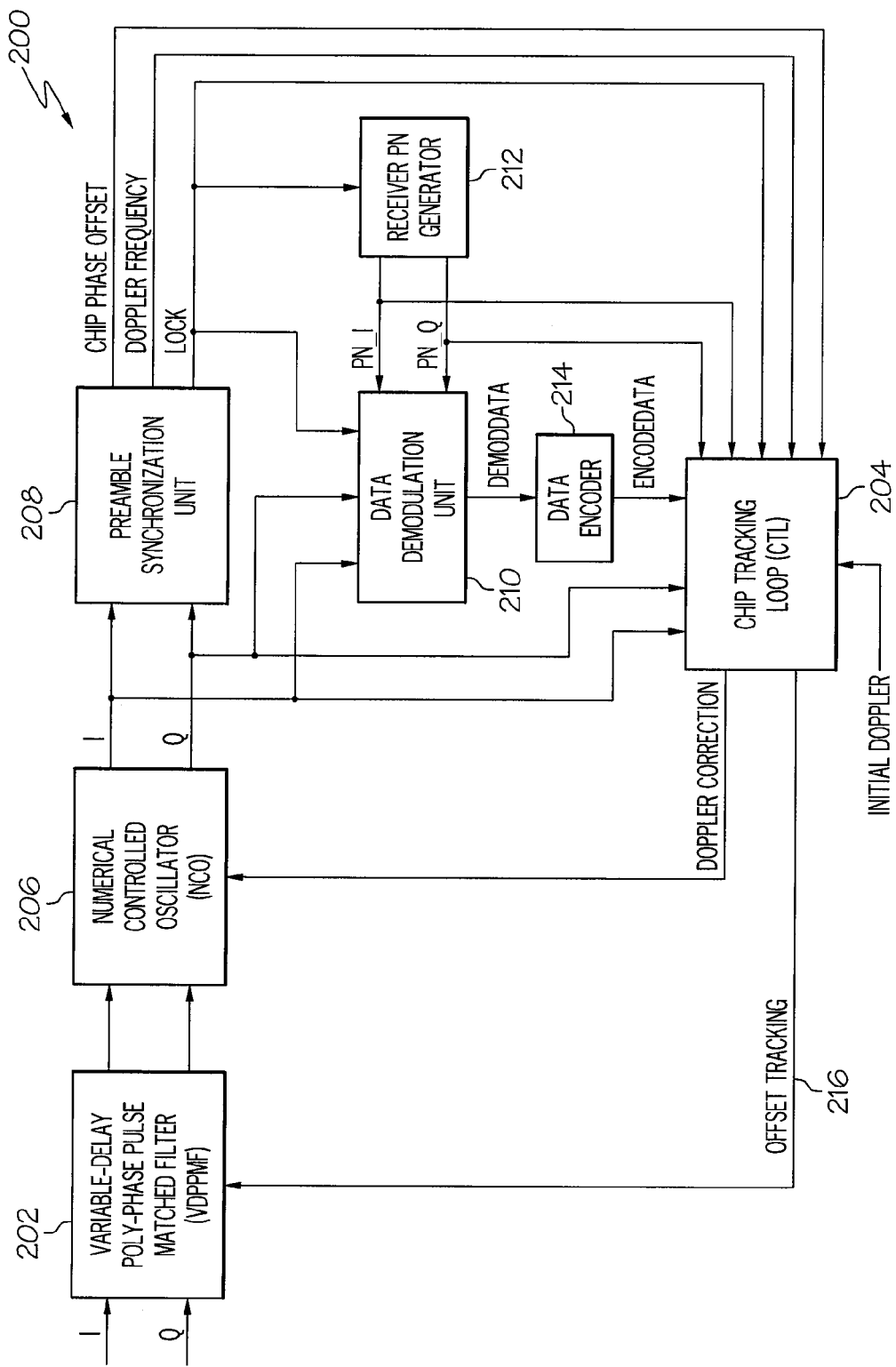
FIG. 2 is a block schematic diagram of an example of a device for fast transition from preamble synchronization to data demodulation of a signal in accordance with an embodiment of the present invention.

FIG. 2 is a block schematic diagram of an example of a device 200 for fast transition or substantially immediate transition from preamble synchronization to data demodulation of a received signal in accordance with an embodiment of the present disclosure. The device 200 may be used for the device 102 in FIG. 1. The device 200 defines a burst modem architecture for substantially immediate transition from a preamble synchronization stage to a data demodulation stage in DSSS communications or other communications techniques with a high Doppler frequency shift. As will be described in more detail, the device 200 uses measurements from the preamble synchronization stage to initialize a chip tracking loop and numerical controlled oscillator, so that they start with near-zero errors for substantially immediate data demodulation. The burst modem architecture enables immediate demodulation at an optimal energy per bit to the noise spectral density ratio (Eb/No) after preamble synchronization.

The device 200 may include a variable-delay poly-phase pulse matched filter 202 (VDPPMF) to receive the complex signal at both in-phase (I) and quadrature (Q) channels. The variable-delay poly-phase matched filter 202 may select one filter from its variable-delay poly-phase filter banks to filter the received signal according to a feedback value from a chip tracking loop (CTL) 204. The CTL 204 may feedback a chip offset tracking value ("Offset Tracking" in FIG. 2) to the VDPPMF 202 for selecting an appropriate variable-delay poly-phase filter from the VDPPM 202 filter bank. The variable-delay poly-phase matched filter performs an interpolation operation to the arrival signal, so as to derive signal values at a selected sub-chip interval position specified in the feedback value from the CTL 204. If the feedback value is fixed over time, the VDPPMF filtering uses a fixed poly-phase filter to remove a fixed chip phase offset between the local and the arrival PN sequences. If the feedback value varies over time, the VDPPMF filtering dynamically selects different variable-delay poly-phase filters corresponding to various interpolation positions so as to track the Doppler frequency shift between the local and the arrival PN sequences.

A numerical controlled oscillator (NCO) 206 may receive the filtered signal from the VDPPMF 202. The NCO 206 may correct any Doppler-caused phase rotation associated with the received signal. The NCO 206 may receive a Doppler correction feedback signal ("Doppler Correction") from the CTL 204 for correction of any Doppler-caused phase rotation associated with the received signal.

An output signal from the NCO 206 may be fed to a preamble synchronization unit 208, a data demodulation unit 210 and the CTL 204. An example of a preamble synchronization unit 208 will be described in more detail with reference to FIG. 3. The preamble synchronization unit 208 may detect arrival of the preamble of the received signal, estimate or measure chip phase offset between the local and the arrival PN sequences, and estimate or measure Doppler frequency shift. As described in more detail herein, the preamble synchronization unit 208 may use inner code matched filters, Differential Binary Phase Shift Keying (DBPSK), and outer code matched filters to accumulate energy from a concatenated preamble sequence in a high Doppler environment. A concatenated preamble sequence is constructed at a transmitter device by modulating an inner code sequence by each symbol of an outer code sequence. The concatenated preamble sequence can be constructed in Quadrature Phase Shift Keying (QPSK) mode or Binary Phase Shift Keying (BPSK) mode. For QPSK mode, the inner code sequence is a sequence of complex binary symbols with independent components at in-phase and quadrature channels. For BPSK mode, the inner code sequence has identical in-phase and quadrature components.

As an embodiment of present disclosure, QPSK mode is used in the following descriptions of the invention. The inner code sequence may be selected from well-known PN sequences of a selected length, while the outer code sequence may be selected from random binary sequences with a minimal sidelobe in its aperiodic autocorrelation function. To combat Doppler-caused phase rotation that prevents coherent energy accumulation over a long concatenated preamble sequence, a Doppler-tolerant Differential Binary Phase Shift Keying (DBPSK) technique may be used to modulate the outer code sequence before the outer code sequence is used to modulate the inner code sequence. The chip phase offset estimation may be performed using Farrow interpolators, variable-delay poly-phase filters or similar apparatus, and a peak comparator. The chip phase offset estimation or measurement ("Chip Phase Offset") immediately after preamble synchronization may be used to set an initial chip phase offset value of the CTL 204 so that the CTL 204 may start with approximately zero pull-in error.

The Doppler frequency shift measurement or estimation ("Doppler Frequency") may be used to set an initial frequency offset value in the CTL 204 and the NCO 206 so that both start at appropriate conditions to correct current Doppler frequency shift impairments. The measured or estimated chip phase offset ("Chip Phase Offset") and Doppler frequency shift ("Doppler Frequency") values from the preamble synchronization unit 208 enable substantially immediate data demodulation at an optimal Eb/No ratio following synchronization. The CTL 204 does not require the initial pull-in process intended for correcting the initial chip phase offset error. The CTL 204 generates an offset tracking value to track Doppler-caused chip frequency drift. The CTL 204 takes the complex signal at the NCO output, forms an early, a prompt and a late signal branch and despreads each branch with a local PN sequence. An error signal between the early and the late branches, which is proportional to the chip phase offset between the local and arrival PN sequences, is then low-pass filtered by the CTL loop filter before feeding back to VDPPMF 202 and NCO 206 for Doppler adjustments.

The preamble synchronization stage or unit 208 detects the preamble sequence in the received signal and synchronizes both the chip and sample between the received signal and a local or receiver pseudo-random noise (PN) generator 212. The PN sequence generated by PN generator 212 is used both by a data demodulation unit 210 and by the CTL 204 to despread the payload data portion of the received signal from the output of NCO 206. The despread payload data is further demodulated in the data demodulation unit 210 to recover the original information bits, referred to as demodulated data, or "DemodData" in FIG. 2.

A data encoder 214 encodes the demodulated data from the data demodulation unit 210 to wipe out or eliminate any data demodulation impact on a chip tracking process in the CTL 204.

Figure 3:
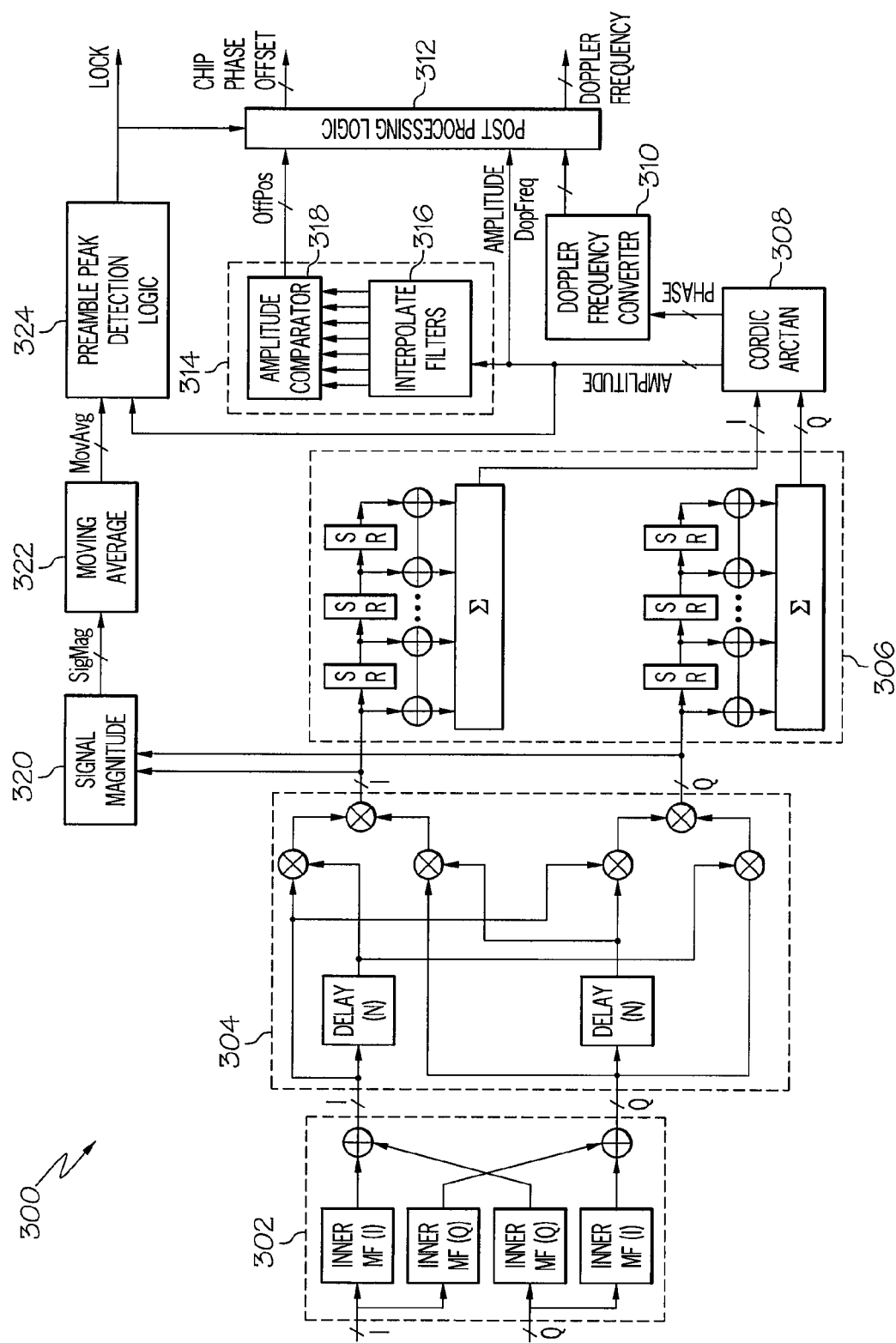
FIG. 3 is a block schematic diagram of an example of a preamble synchronization unit in accordance with an embodiment of the present invention.

FIG. 3 is a block schematic diagram of an example of a preamble synchronization unit 300 in accordance with an embodiment of the present disclosure. The preamble synchronization unit 300 may be used for the preamble synchronization unit 208 in FIG. 2. The preamble synchronization unit 300 may include inner code matched filters (MF) 302 to receive the signal. The inner code matched filters 302 provide coherent accumulation of signal energy from chips within one inner code sequence associated with the received signal.

The coefficients of the inner code matched filters 302 shall match the in-phase and quadrature components of the inner code sequence being used to construct the preamble sequence at the transmitter device. As an embodiment of present disclosure using QPSK mode of preamble construction, a total of four inner code matched filters may be employed, with two Inner MF (I) and two Inner MF (Q), corresponding to the in-phase and quadrature coefficients of the inner code sequence, respectively.

A differentiate binary phase shift keying module 304 (DBPSK) may receive the output from the inner code matched filters 302. The DBPSK module 304 removes any Doppler-caused phase rotation across one outer code sequence symbol interval associated with the received signal. The DBPSK demodulation operation may be represented by complex multiplication of a current and a previous output sample from the inner code matched filters 302, wherein the previous output sample has a delay duration of one inner code sequence.

The preamble synchronization unit 300 may also include outer code matched filters 306 coupled to the DBPSK 304. The outer code matched filters 306 accumulate signal energy from an entire outer code sequence associated with the received signal. The coefficients of outer code matched filters shall match the outer code sequence being used to construct the preamble sequence at the transmitter device.

A cordic arctan unit 308 may receive an output from the outer code matched filters 306. The cordic arctan unit 308 may calculate or determine an amplitude and phase of each accumulated sample of the received signal. Each accumulated sample is a complex number that has an in-phase component of $X_I$ and a quadrature component of $X_Q$. The cordic arctan unit 308 calculates the amplitude as represented by $(X_I^2+X_Q^2)^{1/2}$ and the phase as represented by arctan $(X_Q/X_I)$. A Doppler frequency converter 310 may receive a phase output from the cordic arctan unit 308, and convert the phase value from the cordic arctan 308 into a Doppler frequency "DopFreq". Output from the Doppler frequency converter 310 may be fed to a post processing logic unit 312. The Doppler frequency converter 310 may be a simple multiplier module.

A chip phase offset estimation unit 314 may receive an amplitude value ("Amplitude") from the cordic arctan 308. The chip phase offset estimation unit 314 may include interpolation filters 316 and an amplitude comparator 318. In accordance with an embodiment of the present disclosure, the interpolation filters 316 may be Farrow filters, variable-delay poly-phase filters or similar filters. Coefficients of the interpolation filters 316 are selected in a way that each interpolation filter 316 corresponds to a sub-chip interval offset position at which interpolation takes place. The amplitude comparator 318 compares amplitudes of a set of interpolated samples from interpolation filters 316, and finds an maximal amplitude of the interpolated sample and its corresponding sub-chip interval offset position ("OffPos"). The OffPos value from the chip phase offset estimation unit 314 may be provided to the post processing logic circuit 312. An example of a chip phase offset estimation unit that may be used for unit 314 will be described in more detail with reference to FIG. 4.

A signal magnitude module 320 may be coupled to outputs of the DBPSK 304. The signal magnitude module 320 calculates the magnitude of a complex input sample. A moving average module 322 may receive an output from the signal magnitude module 320. The moving average module 322 calculates an average magnitude value over all samples within a moving average window. In accordance with an embodiment of present disclosure, the moving average window size may be selected to be one-fourth of the entire preamble length.

A preamble peak detection logic module 324 may receive an output from the moving average module 322 and the amplitude value from the cordic arctan unit 308. The post processing logic unit 312 coupled to the preamble peak and detection logic module 324 may adjust for early detection of a preamble synchronization peak associated with the received signal. The preamble peak detection unit 324 may generate a lock signal ("Lock") to lock the post processing logic unit 312 in response to a preamble synchronization peak being detected. The post processing logic unit 312 may then output the resulting chip phase offset value ("Chip Phase Offset") and Doppler frequency value ("Doppler Frequency") similar to that illustrated from preamble synchronization unit 208 in FIG. 2. An example of a post processing logic unit 312 will be described in more detail with reference to FIG. 6.

Figure 4:
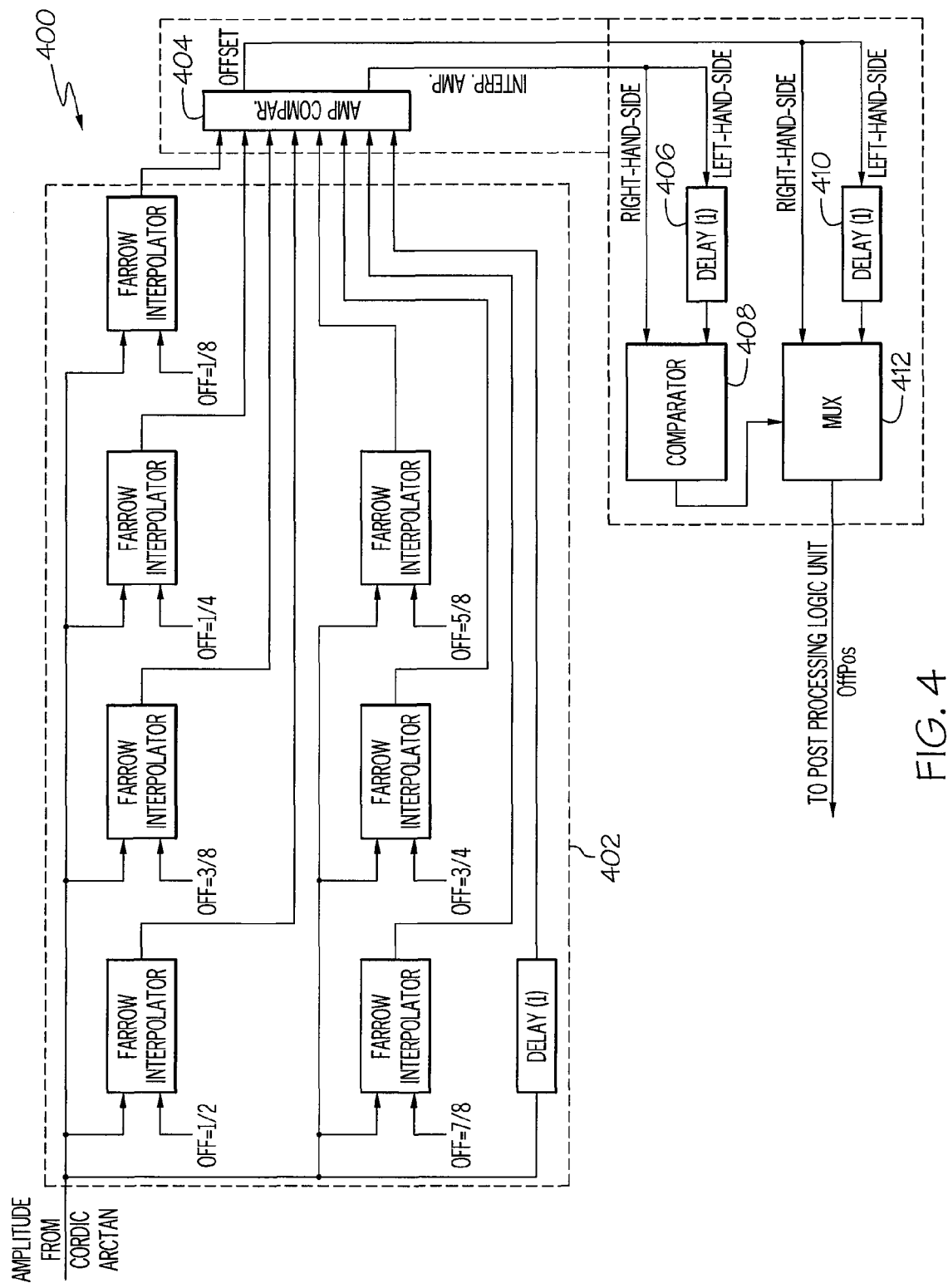
FIG. 4 is a block schematic diagram of an example of a chip phase offset estimation unit in accordance with an embodiment of the present invention.

FIG. 4 is a block schematic diagram of an example of a chip phase offset estimation unit 400 in accordance with an embodiment of the present disclosure. The chip phase offset estimation unit 400 may be used for the chip phase offset estimation unit 314 in FIG. 3. Similar to that previously described, the chip phase offset estimation unit 400 may include a set of Farrow interpolation filters 402, a set of variable-delay poly-phase filters or a single Farrow interpolate filter to interpolate amplitude values ("Amplitude") at pre-selected chip offset positions. In one embodiment, the Farrow interpolate filters 402 may interpolate the amplitude values from the amplitude samples received from the cordic arctan 308 in FIG. 3 at a plurality of (e.g., seven) pre-selected chip offset positions in parallel as illustrated in FIG. 4. In another embodiment, a single Farrow interpolate filter may be used, and interpolations at a plurality of pre-selected chip offset positions may be performed sequentially at the expense of additional latency. Depending on the amplitude samples being operated upon, the same set of Farrow filters 402 may be used to interpolate either the left-hand side or the right-hand side chip offset positions. Interpolation of left-hand side chip offset positions utilizes previous amplitude samples and a current amplitude sample, while interpolation of right-hand side chip offset positions uses a newly arrived amplitude sample to replace the earliest amplitude sample. The outputs from each of the Farrow filters 402 may be compared in an amplitude comparator 404. The amplitude comparator 404 selects the maximal interpolated amplitude from the Farrow filters 402 and the corresponding chip phase offset value. The maximal interpolated amplitude ("Interp. Amp.") and the corresponding chip phase offset value ("Offset") are then saved in registers, Delay(1) module 406 and Delay(1) module 410. When a new amplitude sample from cordic arctan 308 arrives (i.e., input amplitude sample), a similar processing repeats, and a new maximal interpolated amplitude and its corresponding chip phase offset value are generated at the outputs of the amplitude comparator module 404. Another comparator module 408 compares the maximal interpolated amplitude derived from the previous samples (left-hand side, LHS, region) with the maximal interpolated amplitude derived from the new samples (right-hand side, RHS, region). The larger amplitude is selected as the final winner, following a maximal likelihood decision rule. The decision at the output of the comparator module 408 controls a MUX module 412, so that the chip phase offset value ("Offpos") associated with the winner sample is sent to the post processing logic unit 312 in FIG. 3.

Figure 5A:
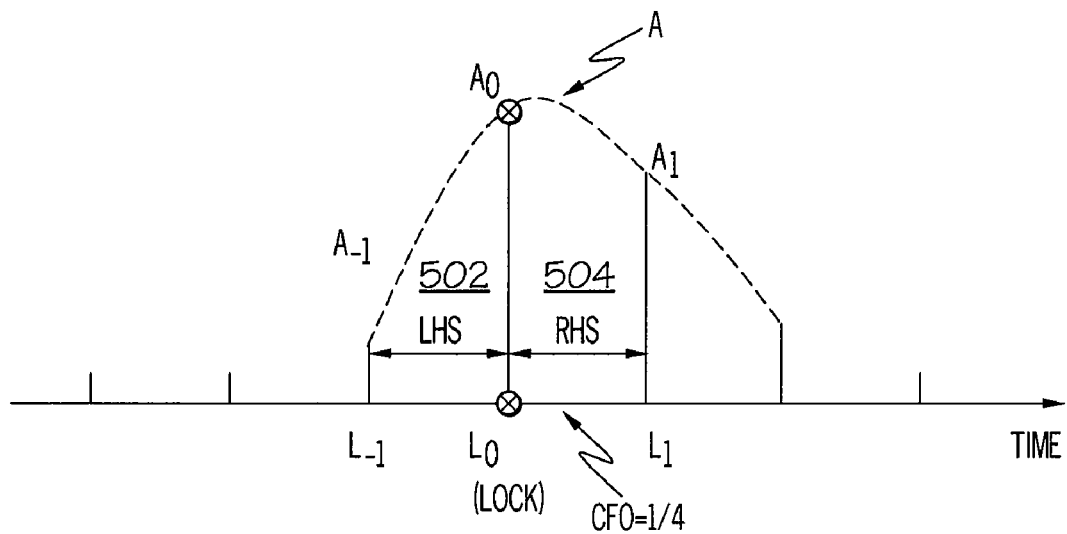
FIGS. 5A and 5B (collectively FIG. 5) are an example of a conceptual timing diagram of the post processing logic unit of FIG. 3 in accordance with an embodiment of the present invention.
Figure 5B:
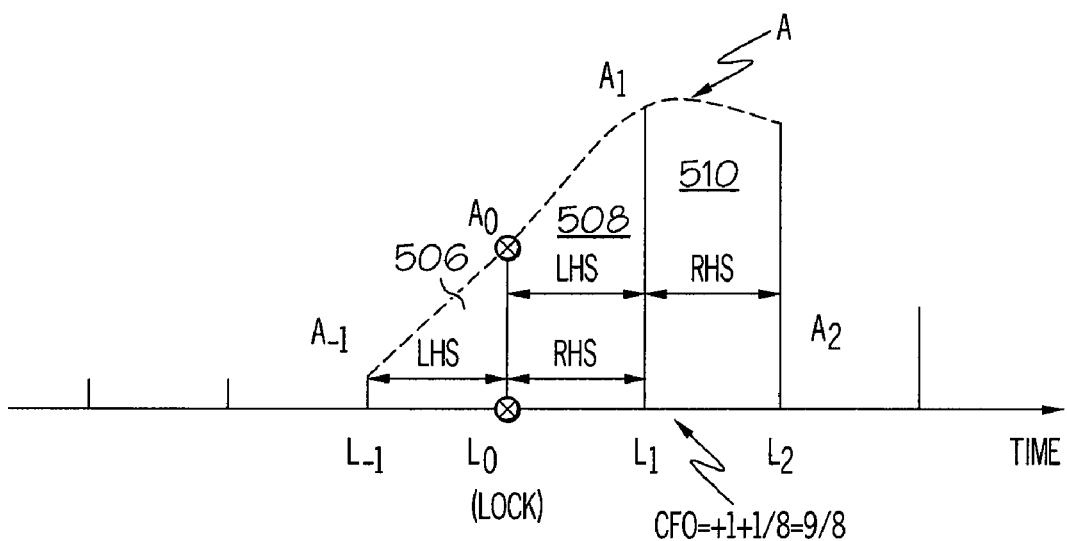

FIGS. 5A and 5B (collectively FIG. 5) illustrate an example of a conceptual timing diagram of the post processing logic unit 312 of FIG. 3 in accordance with an embodiment of the present disclosure. The post processing logic unit 312 adjusts early detection of preamble synchronization peak in accordance with an embodiment of the present disclosure. In FIGS. 5A and 5B, the horizontal axis represents time, and the vertical axis shows the amplitude of input signal samples, "Amplitude," to the post processing logic unit 312 in FIG. 3. Variables $L_{-1}$, $L_0$, $L_1$, and $L_2$ represent input signal sample indexes at various time instances, among which $L_0$ represents the index of the input signal sample that is locked by the preamble peak detection logic unit 324 in FIG. 3. Variables $A_{-1}$, $A_0$, $A_1$, and $A_2$ represent input signal sample amplitudes at various time instances, among which $A_0$ represents the input signal sample amplitude that is locked by the preamble peak detection logic unit 324 in FIG. 3. Variables CFO and A represent the chip phase offset output of the post processing logic unit 312, and the corresponding amplitude. The chip phase offset output has been adjusted to handle the situation of one-sample early detection of preamble synchronization peak. The one-sample early detection may be caused by a large sidelobe in the input signal ahead of a mainlobe peak input signal sample. The mainlobe peak input signal sample is defined as the signal sample having the largest amplitude among all input signal samples, "Amplitude," to the post processing logic unit 312 in FIG. 3. The large sidelobe may be a result of the pulse shaping filtering processing. In FIG. 5A, a normal peak detection scenario is shown, wherein the preamble detection logic unit 324 detects the mainlobe peak input sample $A_o$ at $L_o$. The chip phase offset estimation unit 314 in FIG. 3 or 400 in FIG. 4 interpolates sample amplitudes at a plurality of sub-chip intervals both in a left-hand-side (LHS) region 502 and in a right-hand-side (RHS) region 504. A comparison of maximal amplitudes of LHS and RHS regions produces a chip phase offset (CFO) value of ¼ sample. When a new input signal sample $A_1$ arrives, the post processing unit 312 compares $A_1$ with $A_o$. If amplitude $A_1 < A_o$, as shown in FIG. 5A, no new processing is performed and the derived CFO is affirmed and is output to the chip tracking loop unit 204 in FIG. 2.

In FIG. 5B, an early peak detection scenario is shown, wherein the preamble detection logic unit 324 detects a sidelobe peak input sample $A_o$ at $L_o$, ahead of the mainlobe input signal sample $A_1$. Similar to FIG. 5A, the chip phase offset estimation unit 314 in FIG. 3 or 400 in FIG. 4 interpolates sample amplitudes at a plurality of sub-chip intervals both in a LHS region 506 and in a RHS region 508. When a new input signal sample $A_1$ arrives, the post processing unit 312 finds that amplitude $A_1 > A_o$. Hence a new round of interpolations in the updated RHS region 510 is performed (Note that the updated LHS region is identical to the previous RHS region 508). A final maximal amplitude comparison between interpolated samples from the updated LHS region 508 and the updated RHS region 510 produces a chip phase offset (CFO) value=1+⅛=9/8 samples, in which the value "1" represents one sample advance from the locked sample index of $L_0$, and the value "⅛" represents the sub-chip interval offset in the unit of input signal sample. The derived CFO may be sent to the chip tracking loop unit 204 in FIG. 2.

Figure 6:
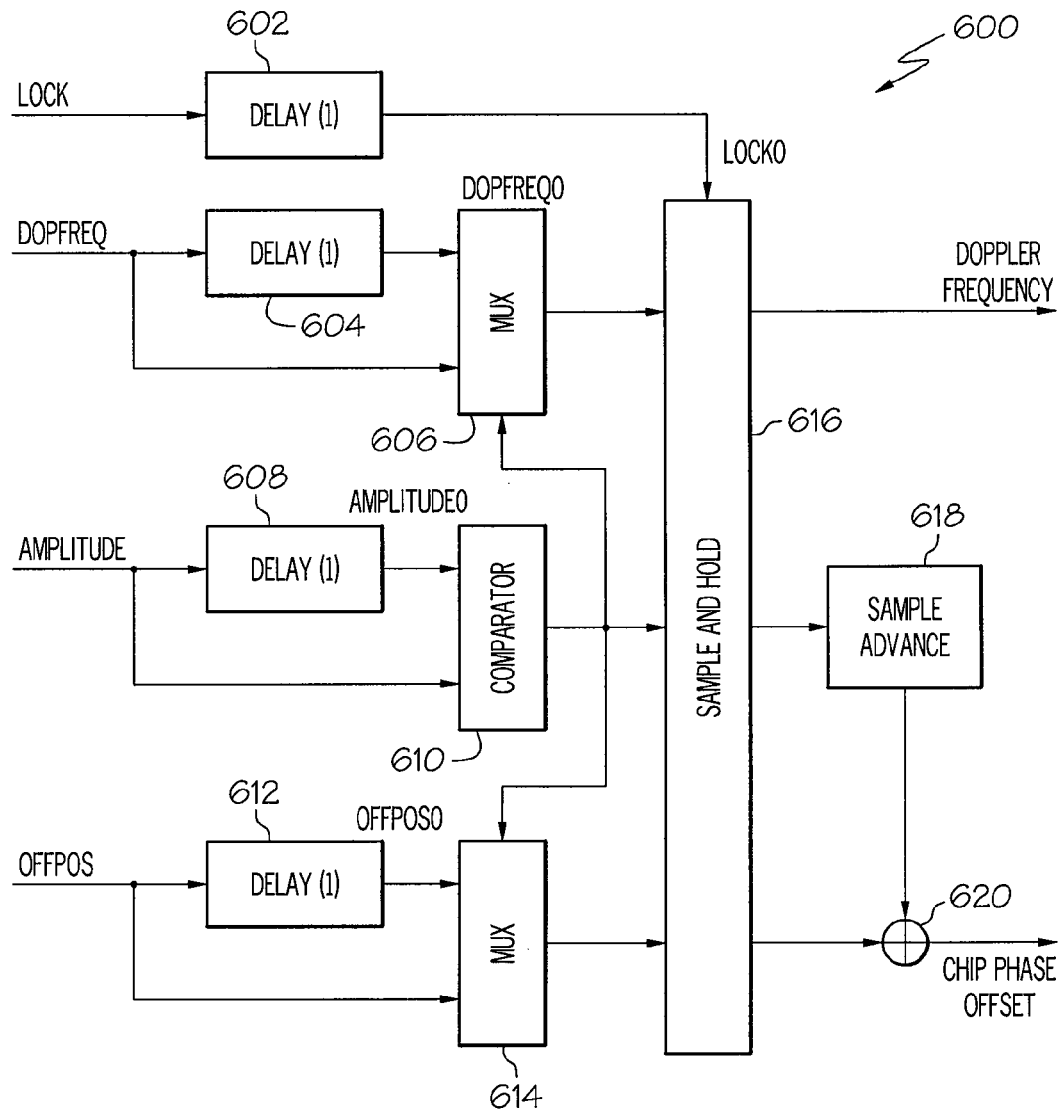
FIG. 6 is a detailed block diagram of an example of a post processing logic unit for adjusting early detection of preamble synchronization peak in accordance with an embodiment of the present invention.

FIG. 6 is a detailed block diagram of an example of a post processing logic unit 600 for adjusting early detection of preamble synchronization peak in accordance with an embodiment of the present disclosure. The post processing logic unit 600 may be used for the post processing unit 312 of FIG. 3. As explained with reference to FIG. 5, the post processing logic unit 600 may compare the amplitudes of the input signal samples being locked and the one immediately following the locked sample. If the later sample has a larger amplitude, the chip phase offset may advance by one sample, plus the newly derived sub-chip interval offset. As previously discussed with reference to FIG. 3 a "Lock" signal is received from the preamble peak detection logic unit 324 in FIG. 3. The Lock signal is activated when the arrival of a preamble sequence is detected. A delay(1) module 602 produces a "Lock0" signal with one sample delay to the input Lock signal. Similarly, three additional delay(1) modules 604, 608 and 612 produce one-sample delayed input signals of a Doppler frequency estimation, "DopFreq0," a cordic amplitude signal, "Amplitude0," and an sub-chip interval offset signal, "OffPos0," respectively. One-sample delayed input signals, DopFreq0, Amplitude0 and OffPos0, are time-aligned with the one-sample delayed Lock0 signal. Thus, when the Lock0 signal is used to time-sample DopFreq0, Amplitude0 and OffPos0 signals, signal values exactly at the preamble lock position are obtained. On the other hand, when the Lock0 signal is used to time-sample original DopFreq, Amplitude and OffPos, signal values at one-sample after the preamble lock position are obtained. A decision to select either values at lock position or values one-sample after lock position may be made at a comparator module 610. The comparator module 610 receives inputs of Amplitude and Amplitude0, and compares their values. If Amplitude0 is greater than the Amplitude one-sample after lock, it is a normal preamble peak detection scenario as shown in the example in FIG. 5A. In this normal scenario, a multiplexer (MUX) module 606 and a MUX module 614, being controlled by the comparator 610 output, select DopFreq0 and OffPos0, respectively. A sample and hold module 616 captures values at lock position and sends to the chip tracking loop (CTL 204 in FIG. 2). A sample advance module 618 is not active in this scenario. If Amplitude0 is less than the Amplitude one-sample after lock, it is an early preamble peak detection scenario as shown in the example in FIG. 5B. In this early detection scenario, the MUX module 606 and the MUX module 614 select one-sample delayed values of DopFreq and OffPos, respectively. The sample advance 618 is activated by the output from the comparator module 610 to provide one sample advance to an addition unit 620. After adjustment for the early peak detection scenario, the Doppler Frequency and the Chip Phase Offset values are obtained and sent to the chip tracking loop unit (CTL) 204 in FIG. 2.

Figure 7:
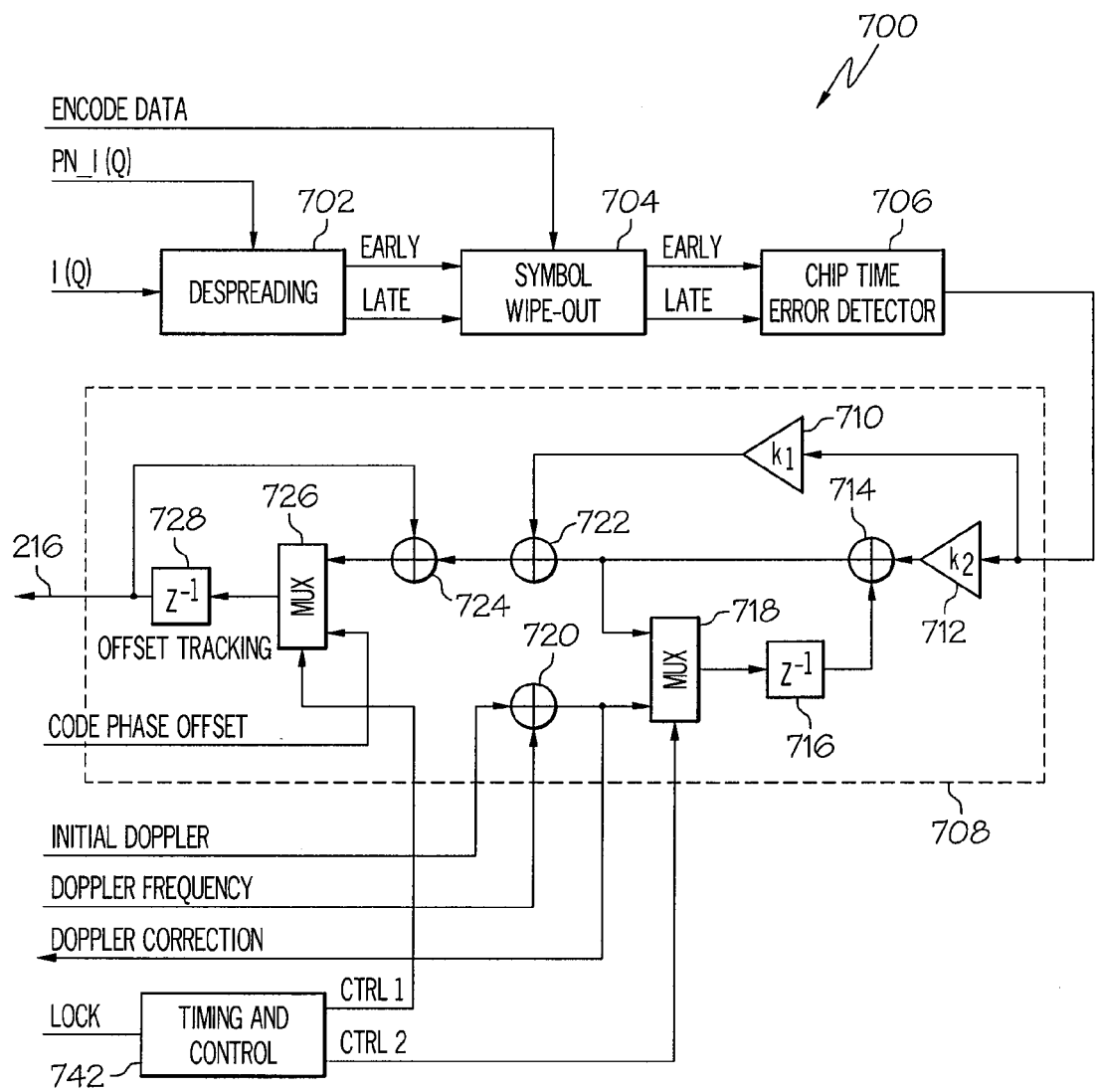
FIG. 7 is a block diagram of an example of a chip tracking loop in accordance with an embodiment of the present invention.

FIG. 7 is a block diagram of an example of a chip tracking loop (CTL) 700 in accordance with an embodiment of the present disclosure. The CTL 700 may be used for the chip tracking loop (CTL) 204 in FIG. 2. A generic non-coherent early-late delay lock loop structure with $2^{nd}$ order loop filter is shown as an example to illustrate an initial tracking parameter configuration circuit pertinent to an embodiment of the present disclosure. In FIG. 7, a despreading unit 702 receives a spread spectrum payload data signal "I (Q)" from an output of the numerical controlled oscillator (NCO) 206 in FIG. 2, and receives a receiver generated PN sequence "PN_I (Q)" from an output of the receiver PN generator unit 212 in FIG. 2. The despreading unit 702 despreads I (Q) with two time-shifted versions of PN_I (Q) and produces an early despread sequence ("Early") and a late despread sequence ("Late"). A symbol wipe-out unit 704 receives the EncodeData sequence ("EncodeData") from the data demodulation unit 210 in FIG. 2, and then removes the modulation impact from information symbols carried in the early and late despread sequences. A chip time error detector unit 706 calculates a chip time error signal using the early and late despread sequences. The chip time error signal is then low-pass filtered by a loop filter unit 708. The loop filter unit 708 generates an offset tracking signal ("Offset Tracking") to control the variable-delay poly-phase pulse marched filter unit 202 in FIG. 2. The initial tracking parameter configuration circuit pertinent to the present invention resides in the loop filter unit 708. In accordance with an embodiment of present invention, a $2^{nd}$ order loop filter may be used. Inside the loop filter unit 708, there are two feedback delay modules 716 and 728 that constitutes the $2^{nd}$ order loop filter. Feedback signals are joined with feed-forward signals at summation modules 714 and 724, respectively. A first multiplication module ($K_1$) 710 and a second multiplication module ($K_2$) 712 control the frequency response of the loop filter unit 708. The initial tracking parameter configuration circuit is realized by two multiplexer (MUX) modules 718 and 726. The two MUX modules 718 and 726 allow selection between input parameters from outside the loop filter unit 708 and regular loop filter feedback signals. An input parameter to the MUX module 726 is the chip phase offset parameter ("Chip Phase Offset") estimated by the preamble synchronization unit 208 in FIG. 2. Immediately after the preamble synchronization peak is detected, the estimated chip phase offset inserts a constant tracking offset ("Offset Tracking") into the CTL feedback loop 216 in FIG. 2 to correct the initial chip phase offset between the PN sequence PN_I (Q) generated in the receiver and the PN sequence embedded in the received signals.

An input parameter to the MUX module 718 is a Doppler correction parameter ("Doppler Correction"). The Doppler correction parameter is calculated by adding two input parameters, a Doppler frequency ("Doppler Frequency") parameter or signal and an initial Doppler ("Initial Doppler") parameter or signal. The Doppler frequency parameter is estimated by the preamble synchronization unit 208 as illustrate in FIG. 2. The initial Doppler may be provided by upper layer network protocols which keep track of a set of the most recent Doppler frequency shifts of corresponding communicating node pairs. If the initial Doppler estimation is not available, a default value of zero may be used.

A timing and control unit 742 receives a Lock signal ("Lock") as an input. The timing control input unit 742 generates control signals, "Ctrl1" and "Ctrl2," to control the operation of the two MUX modules 726 and 718, respectively.

The sequence of MUX operations may follow three stages controlled by Ctrl1 and Ctrl2 from the timing and control unit 742. Before preamble synchronization is detected, the chip phase offset and the Doppler frequency are both set to zero. The control output signal Ctrl1 from the timing and control unit 742 controls the MUX module 726 to use a zero input for the feedback loop, while the control signal Ctrl2 controls the MUX module 718 to use the initial Doppler value obtained from upper layer network protocols.

Immediately after preamble synchronization is detected, the estimated chip phase offset is received by the MUX module 726 and is injected into the feedback loop 216 of the CTL 700 under the control of the control signal Ctrl1. Meanwhile, the estimated Doppler frequency is added with the initial Doppler by a summation unit 720 and the sum is injected into the $2^{nd}$ order loop filter 708 by MUX 718 under the control of the control signal Ctrl2. When the first loop filter update cycle arrives, the MUX modules 726 and 718 switch to the receiver regular chip tracking loop feedback signals under the control of Ctrl1 and Ctrl2, respectively.

While the embodiment of the present disclosure may have been described as being embodied in a hardware implementation, those skilled in the art will recognize that the features and elements of the embodiments of the present disclosure may also be implemented in software or a combination of hardware and software.

Figure 8:
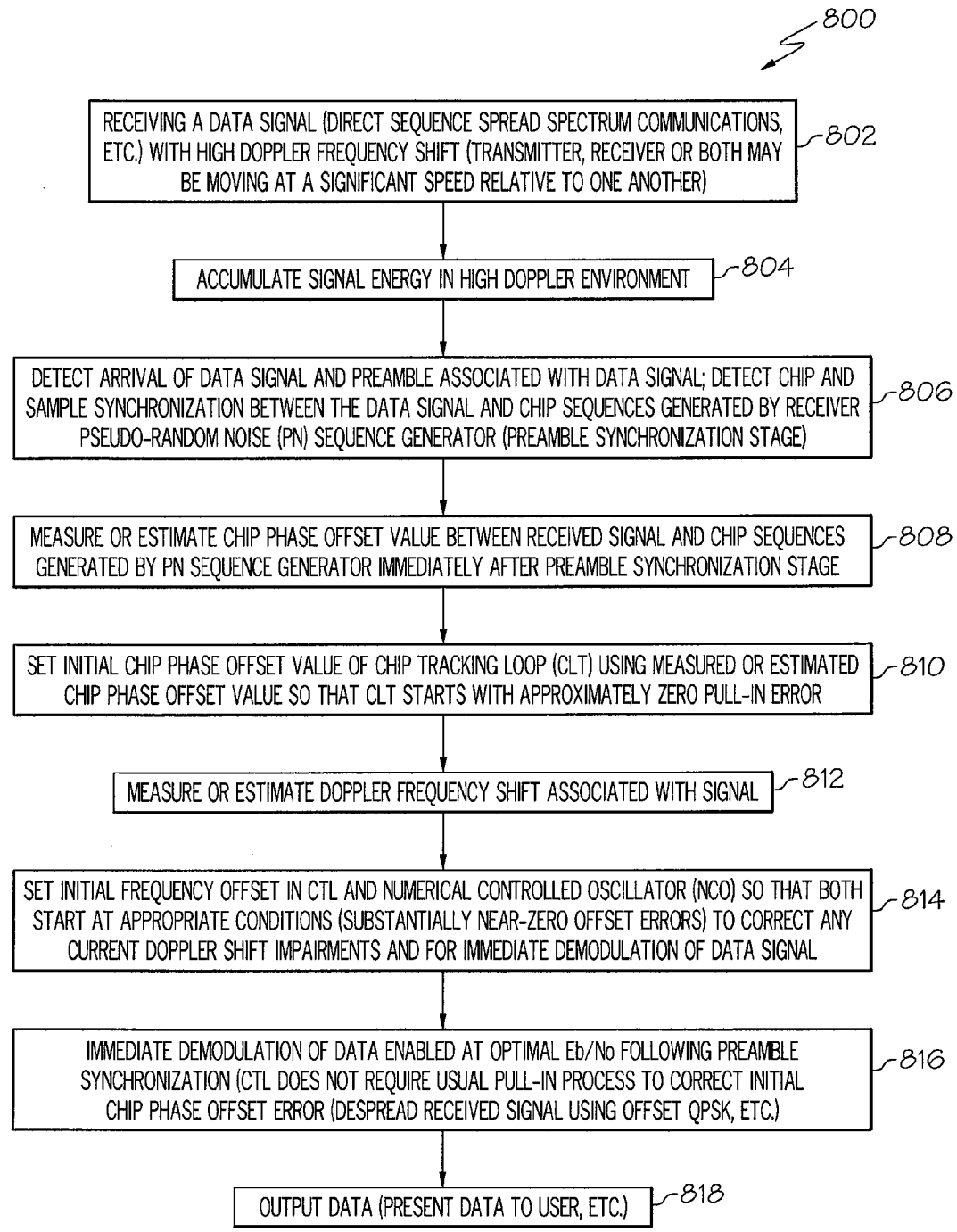
FIG. 8 is a flow chart of an example of a method for fast transition from preamble synchronization to data demodulation of a signal in accordance with an embodiment of the present invention.

FIG. 8 is a flow chart of an example of a method 800 for fast transition or substantially immediate transition from preamble synchronization to data demodulation of a signal in accordance with an embodiment of the present disclosure. The method 800 may be embodied in and/or performed by the exemplary devices and components illustrated in FIGS. 1-7.

In block 802, a data signal may be received. The signal may be a direct sequence spread spectrum (DSSS) communications or similarly modulated signal. The signal may be characterized by having a high Doppler frequency shift associated with it. The high Doppler frequency shift may be the result of the transmitter that sent the signal, the receiver, or both may be moving at a significant speed relative to one another. For example, one communications device may be a ground station and the other may be a fast moving aircraft or spacecraft.

In block 804, signal energy may be accumulated in the high Doppler environment. In block 806, arrival of the data signal and a preamble associated with the data may be detected. Chip and sample synchronization between the data signal and chip sequences generated by the receiver PN sequence generator or similar component may be achieved. As previously described, this synchronization detection may be performed in a preamble synchronization stage or unit.

In block 808, a chip phase offset value between the received signal and chip sequences generated by the PN sequence generator or the like may be measured or estimated. The measurement or estimate is preferably performed substantially immediately after the synchronization stage.

In block 810, an initial chip offset value of the chip tracking loop may be set using the measured or estimated chip phase offset value so that the chip tracking loop may start at approximately zero pull-in error.

In block 812, a Doppler frequency shift associated with the received signal may be measured or estimated. In block 814, an initial frequency offset in the chip tracking loop and numerical controlled oscillator of the receiver may be set so that both start at appropriate conditions to correct any current Doppler shift impairments and for substantially immediate demodulation of the data signal. The appropriate starting conditions for the chip tracking loop and numerical controlled oscillator is substantially near-zero offset errors of the chip phase and Doppler shift for immediate demodulation of the received signal.

In block 816, substantially immediate demodulation of the data may begin. Immediate demodulation of the data may be enabled at optimal energy per information bit over noise spectrum density ratio (Eb/No) following preamble synchronization. The chip tracking loop does not require the usual pull-in process to correct initial chip phase offset error.

In accordance with an embodiment of the present disclosure, despreading of the received signal that have been spread modulated at transmitter using offset quadrature phase shift keying (OQPSK) method may be despread using an OQPSK despreading module or algorithm, which may include means to generate an output in-phase signal using signal processing defined by equation 1:

$$(X_{Id} \cdot P_I + X_Q \cdot P_Q) + (X_I \cdot P_I + X_{Qd} \cdot P_Q) \qquad \text{Equation 1}$$

Where $X_{Id}$ is an in-phase component of the input signal with one sample delay; $X_{Qd}$ is the quadrature component of the input signal with one sample delay; $P_I$ and $P_Q$ are the pseudorandom sequence used for OQPSK spreading. The module may also include means to generate a quadrature signal using signal processing defined by equation 2:

$$(-X_{Id} \cdot P_Q + X_Q \cdot P_I) - (X_I \cdot P_Q - X_{Qd} \cdot P_I) \qquad \text{Equation 2}$$

In block 818, the demodulated data may be outputted. The data may be presented to a user or applied to some other use or purpose.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present disclosure. The following claims are in no way intended to limit the scope of the disclosure to the specific embodiments described herein.

What is claimed is:

1. A device for fast transition from preamble synchronization of a received signal to demodulation of the received signal, comprising:
   a chip tracking loop to generate an offset tracking value to track any initial chip phase offset and Doppler-caused chip frequency drift associated with the received signal;
   a numerical controlled oscillator to correct any Doppler-caused phase rotation associated with the received signal;
   a preamble synchronization unit to detect a preamble of the received signal, and to measure a chip phase offset and a Doppler frequency shift associated with the received signal, wherein the chip phase offset is used to set an initial chip phase offset value of the chip tracking loop so that the chip tracking loop starts with approximately a zero pull-in error, and the Doppler frequency shift is used to set initial frequency offset values in the chip tracking loop and the numerical controlled oscillator so that both start with near-zero offset errors for demodulation of the received signal; and
   an output device to output the data demodulated from the received signal.

2. The device of claim 1, further comprising a pseudo-random noise generator to generate pseudo-random noise chip sequences to reconstruct data from the received signal, wherein the pseudorandom noise chip sequences correspond to those sequences used for data spreading in a transmitter that transmitted the received signal.

3. The device of claim 2, further comprising a variable-delay poly-phase pulse matched filter unit to select a filter from a variable-delay poly-phase filter bank to shape a waveform of the received signal and to correct the chip phase offset between the received signal waveform and the chip sequences generated by the pseudo-random noise generator.

4. The device of claim 1, further comprising a data demodulation unit to demodulate the received signal to extract a payload data portion of the received signal.

5. The device of claim 4, further comprising a data encoder unit to encode the demodulated payload data to wipe out any data modulation impact on a chip tracking process in the chip tracking loop.

6. The device of claim 1, further comprising a chip phase offset estimation unit to measure an initial chip phase offset between the received signal and a chip sequence generated by a pseudo-random noise generator to reconstruct data from the received signal.

7. The device of claim 6, wherein the chip phase offset estimation unit comprises:
   a set of interpolation filters to derive interpolated signal amplitudes at various pre-determined chip phase offset positions; and
   a comparator to select a maximal interpolated amplitude and corresponding chip phase offset.

8. The device of claim 7, further comprising a post-processing unit to adjust for an early detection of a preamble synchronization peak position.

9. The device of claim 1, further comprising means for correcting an initial chip phase offset and the Doppler frequency shift to eliminate any initial pull-in time in the chip tracking loop and to start data demodulation at an optimal chip energy to noise ratio after synchronization of the preamble of the received signal.

10. The device of claim 9, further comprising a timing and control logic unit to determine step-by-step operations to apply the initial chip phase offset and Doppler frequency shift to loop filters in the chip tracking loop and numerical controlled oscillator.

11. The device of claim 1, wherein the preamble synchronization unit comprises:
   an inner code matched filter for coherent accumulation of signal energy from chips within one inner code sequence, wherein the inner code matched filter receives an output from the numerical controlled oscillator;
   a differential binary phase shift keying unit to apply a differential phase shift keying demodulation to remove any Doppler-caused phase rotation across the outer code sequence symbols;
   an outer code matched filter for non-coherent accumulation of signal energy from an entire outer code sequence;
   a cordic arctan unit to calculate an amplitude and phase of each accumulated sample from the outer code matched filter;
   a Doppler frequency converter unit to convert a phase value from the cordic arctan unit into a Doppler frequency; and
   a chip phase offset estimation unit to determine a maximal amplitude of an interpolated sample and its corresponding subchip-interval offset value from the cordic arctan unit.

12. The device of claim 1, further comprising a unit to despread the received signal that is spread modulated at a transmitter with an offset quadrature phase shift keying method.

13. The device of claim 12, wherein the unit to despread the received signal using offset quadrature phase shift keying comprises:
   a module to generate an output in-phase signal using signal processing defined by $(XId \cdot Pi + XQ \cdot PQ) + (Xi - 1^3 1 + XQd \cdot PQ)$; and
   a module to generate a quadrature signal using signal processing defined by $(-Xid \cdot PQ + XQ \cdot PI) - (Xi \cdot PQ - XQd \cdot Pi)$, wherein XI is an in-phase component of an input signal; XQ is the quadrature component of the input signal;)(id is an in-phase component of the input signal with one sample delay; XQd is the quadrature component of the input signal with one sample delay; PI and PQ are in-phase and quadrature components of a PN sequence used for OQPSK spreading.

14. A communications device, comprising:
a receiver to receive a communications signal;
a preamble synchronization stage to detect a preamble of the received communications signal;
a data demodulation stage to demodulate the received communications signal; and
a burst modem architecture for transition from the preamble synchronization stage to the data demodulation stage in Direct Sequence Spread Spectrum (DSSS) communication with a significant Doppler frequency shift, wherein the preamble synchronization stage measures a chip phase offset and a Doppler frequency shift associated with the received communications signal, wherein the chip phase offset is used to set an initial chip phase offset value of a chip tracking loop so that the chip tracking loop starts with approximately a zero pull-in error, and the Doppler frequency shift is used to set initial frequency offset values in the chip tracking loop and a numerical controlled oscillator so that both start with near-zero offset errors for demodulation of the received communications signal; and
an output device to output the demodulated data.

15. The communications device of claim 14, further comprising:
a preamble synchronization unit to detect the preamble of the received signal, and to measure a chip phase offset and a Doppler frequency shift associated with the received signal.

16. The communications device of claim 14, further comprising:
a pseudo-random noise (PN) generator to generate copies of PN chip sequences identical to those in a transmitter for data spreading;
a variable-delay poly-phase pulse matched filter unit to receive the signal and to select a filter from a variable-delay poly-phase filter bank to shape a waveform of the received signal and to correct a chip phase offset between the received signal waveform and the chip sequences generated by the pseudo-random noise generator;
wherein the numerical controlled oscillator corrects any Doppler-caused phase rotation associated with the received signal;
a preamble synchronization unit to detect arrival of the communications signal, to estimate a Doppler shift in the communications signal and to estimate an initial chip phase offset between the communications signal and the chip sequence generated by the PN generator;
wherein the chip tracking loop continuously tracks a chip phase offset between the received signal waveform and the chip sequences generated by the PN generator;
a data demodulation unit to demodulate the received signal to extract a payload data portion of the received signal; and
a data encoder unit to encode the demodulated payload data to wipe out any data modulation impact on a chip tracking process in the chip tracking loop.

17. A method for fast transition from preamble synchronization of a received signal to demodulation of the received signal, comprising:
detecting a preamble of the received signal;
measuring a chip phase offset and a Doppler frequency shift associated with the received signal;
setting an initial chip phase offset value of a chip tracking loop in response to the measured chip phase offset so that the chip tracking loop starts with approximately a zero pull-in error;
setting initial frequency offset values in the chip tracking loop and a numerical controlled oscillator in response to the measured Doppler frequency shift so that the chip tracking loop and the numerical controlled oscillator start with near-zero offset errors for demodulation of the received signal;
demodulating the received signal to extract payload data; and outputting the payload data.

18. The method of claim 17, further comprising:
generating an offset tracking value to track any Doppler-caused chip frequency drift associated with the received signal; and correcting any Doppler-caused phase rotation associated with the received signal.

19. The method of claim 17, further comprising selecting a filter from a variable-delay poly-phase filter bank to shape a waveform of the received signal and to correct the chip phase offset between the received signal waveform and chip sequences generated by a pseudo-random noise generator.

20. The method of claim 17, further comprising encoding the demodulated payload data to wipe out any data modulation impact on a chip tracking process in the chip tracking loop.

21. The method of claim 17, further comprising correcting the initial chip phase offset and the Doppler frequency shift to eliminate any initial pull-in time in the chip tracking loop and to start data demodulation at an optimal chip energy to noise ratio after synchronization of the preamble of the received signal.

22. The method of claim 17, further comprising:
accumulating signal energy from chips within one inner code sequence,
applying a differential phase shift keying modulation to remove any Doppler-caused phase rotation across outer code sequence symbols;
accumulating signal energy from an entire outer code sequence;
calculating an amplitude and phase of each accumulated sample from an outer code matched filter;
converting a phase value from a cordic arctan unit into a Doppler frequency; and
determining a maximal amplitude of an interpolated sample and its corresponding sub-chip-interval offset value from the cordic arctan unit.

23. The method of claim 17, further comprising despreading the received signal using offset quadrature phase shift keying.

24. The method of claim 23, further comprising:
generating an output in-phase signal using signal processing defined by $(Xid \cdot Pi + X_Q \cdot P_Q) + (Xi \cdot PI + X_Q d \cdot P_Q)$; and
generating a quadrature signal using signal processing defined by $(-Xid \cdot P_Q + X_Q \cdot PI) - (XI \cdot PQ - XQd \cdot PI)$, wherein XI is an in-phase component of an input signal; XQ is the quadrature component of the input signal;)(Id is an in-phase component of the input signal with one sample delay; Xcld is the quadrature component of the input signal with one sample delay;
PI and PQ are in-phase and quadrature components of a PN sequence used for OQPSK spreading.

* * * * *